United States Patent [19]

Rugenstein

[11] 4,192,454
[45] * Mar. 11, 1980

[54] SOLAR HEATED BUILDING STRUCTURE

[76] Inventor: Robert W. Rugenstein, 2203 N. Malton Ave., Simi Valley, Calif. 93063

[ * ] Notice: The portion of the term of this patent subsequent to Sep. 20, 1994, has been disclaimed.

[21] Appl. No.: 895,499

[22] Filed: Apr. 11, 1978

[51] Int. Cl.² .............................................. F24J 3/02
[52] U.S. Cl. ................................... 126/427; 126/437; 126/429
[58] Field of Search ................ 237/1 A; 126/270, 271

[56] References Cited
U.S. PATENT DOCUMENTS

| | | | |
|---|---|---|---|
| 1,742,861 | 1/1930 | Johnson | 126/271 |
| 2,529,154 | 11/1950 | Hammond et al. | 126/271 |
| 2,680,565 | 6/1954 | Lof | 126/271 |
| 3,179,105 | 4/1965 | Falbel | 126/270 |
| 3,254,703 | 6/1966 | Thomason | 126/270 |
| 3,450,192 | 6/1969 | Hay | 126/271 |
| 3,513,828 | 5/1970 | Masters | 126/271 |
| 3,841,302 | 10/1974 | Falbel | 126/270 |
| 3,859,980 | 1/1975 | Crawford | 126/271 |
| 3,893,506 | 7/1975 | Laing | 126/271 |
| 3,902,474 | 9/1975 | Pyle | 126/270 |
| 3,908,631 | 9/1975 | Rom | 126/270 |
| 3,918,430 | 11/1975 | Stout et al. | 126/271 |
| 3,989,032 | 11/1976 | Harrison | 126/271 |
| 3,991,937 | 11/1976 | Heilemann | 237/1 A |
| 4,049,195 | 9/1977 | Rugenstein | 237/1 A |
| 4,051,999 | 10/1977 | Granger et al. | 237/1 A |
| 4,095,369 | 6/1978 | Posnansky et al. | 237/1 A |
| 4,111,359 | 9/1978 | Trombe et al. | 237/1 A |
| 4,126,270 | 11/1978 | Hummel | 237/1 A |

*Primary Examiner*—Henry C. Yuen
*Attorney, Agent, or Firm*—Luke J. Wilburn, Jr.; Wellington M. Manning, Jr.

[57] ABSTRACT

A solar heated building structure comprising an exterior shell including side walls and a roof section with the major portion of the roof section comprised of light transmitting panels or panes of material to permit passage of sunlight into the attic section of the building structure. The structure is provided with a central vertical hollow support column containing liquid storage tanks for the circulation and collection of heated water from a flexible conduit system located on the floor of the attic compartment. The central column serves as a heating core for the structure and communicates by way of air conduits or ducts with the living areas of the structure. Fan means are provided for continuously or intermittently circulating air over the hot water storage tanks in the core to transfer heat therefrom and distribute the heated air into the living areas.

9 Claims, 4 Drawing Figures

SOLAR HEATED BUILDING STRUCTURE

The present invention relates to a solar heated building structure and, more particularly, to a building construction including an attic solar heat collection compartment having associated liquid and air conduit system for supplying heated water to storage means in a hollow central support column of the building structure, whereby living spaces of the building may be effectively and economically heated by forced air passed through the column support.

Solar collectors for industrial and household uses are well known and are increasingly employed in current building construction. Because of increasing costs of fossil fuels, major national and international efforts are now being directed to more efficient and effective utilization of solar energy for heating and cooling purposes.

A major concern in utilization of such systems is a need to develop more efficient and economical means for collecting and storing sunlight heat energy, whereby the same may be made reasonably available to the average homeowner as a primary source of energy.

My prior U.S. Pat. No. 4,049,195 discloses a solar heated building structure for home or industrial use which utilizes the attic compartment of the structure as a solar heat collector, with the roof section being formed of a plurality of transparent, light-transmitting panes or panels of material. As disclosed, the structure is spherically shaped and has a semi-spherical roof section, with heated air collected in the attic compartment being passed by way of conduits extending through a central vertical support column to a basement area containing a conventional furnace and a water heat exchange unit. The hot air accumulated in the attic compartment is circulated by suitable ducting to heat the living compartments of the structure, as well as providing a source of heat for a hot water storage unit.

Other solar heating systems emplying air or liquid collector systems located on the roof or in an attic area of a home are disclosed in prior U.S. Pat. Nos. 2,680,565 and 3,902,474.

The present invention is directed to an improved solar heated building construction of a type similar to that disclosed in my said prior U.S. Pat. No. 4,049,195 but wherein a central hollow support column is employed as a heating core for collection and storage of heated water which has been circulated through flexible conduit means located on the floor of the attic compartment of the structure, and wherein air is continuously or intermittently recirculated through the central heating core and across the hot water storage means to provide heated air for living areas of the building.

In its broad aspects, the solar heated building structure of the present invention comprises an exterior wall and roof structure, or shell, containing a living area, a central heating core for collection, storage, and circulation of heat exchange liquid and air mediums, and an attic compartment, with the roof structure comprised in major part of light-transmitting panes, or panels of material. The floor of the attic compartment supports a flexible conduit system which may be easily and economically installed and employed for the circulation of a liquid, such as water, to provide a heat exchange medium for heating the building structure.

The present invention will be better understood from the following detailed description of a preferred embodiment thereof, when taken with the accompanying drawings, in which.

Figure 1:
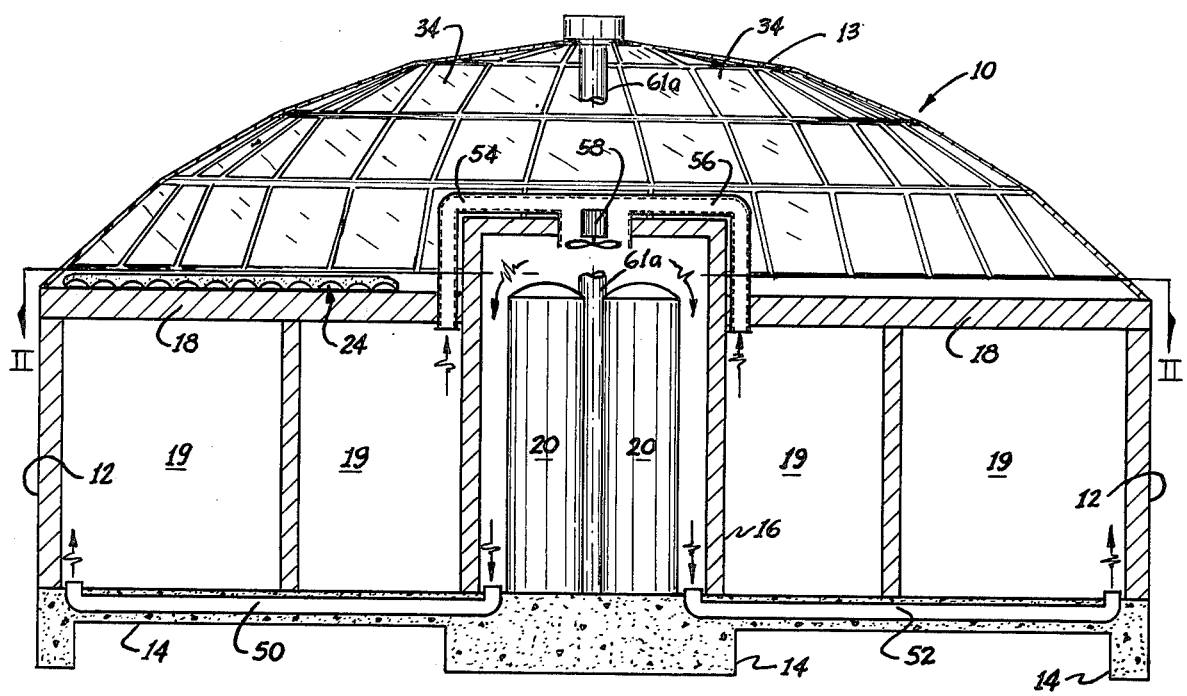
FIG. 1 is a vertical sectional elevation view of the solar heated building structure of the present invention.

Referring more particularly to the drawings, FIG. 1 illustrates a solar heated building structure 10 of the present invention which comprises an outer, water-resistant shell composed of vertical walls 12 and a roof structure 13 supported on a suitable foundation or base, shown as a concrete slab and footings 14. Extending vertically upward through the center of the shell is a hollow column 16 which serves as a central support member for a horizontal support floor 18 of the structure.

Hollow column 16 may be suitably constructed of masonry, metal or wood building materials and is relatively air-tight construction so that the column serves both as an air conduit and a heat storage core for circulation of air through and to and from the living areas 19 of the structure, as will be explained.

As best seen in FIG. 1, a pair of large, water storage tanks 20 are located in column 16 and are supported on the central portion of the concrete foundation slab and footing 14. The two storage tanks 20 communicate by suitable supply conduit means 21 (FIG. 4) provided with flow control means, including a pumping section 22 for supplying water from the tanks to a flexible conduit system, generally indicated at 24, located on the floor of the attic compartment, and a return conduit 26 is provided for directing heated water from the flexible conduit system 24 back into storage tanks 20.

Figure 2:
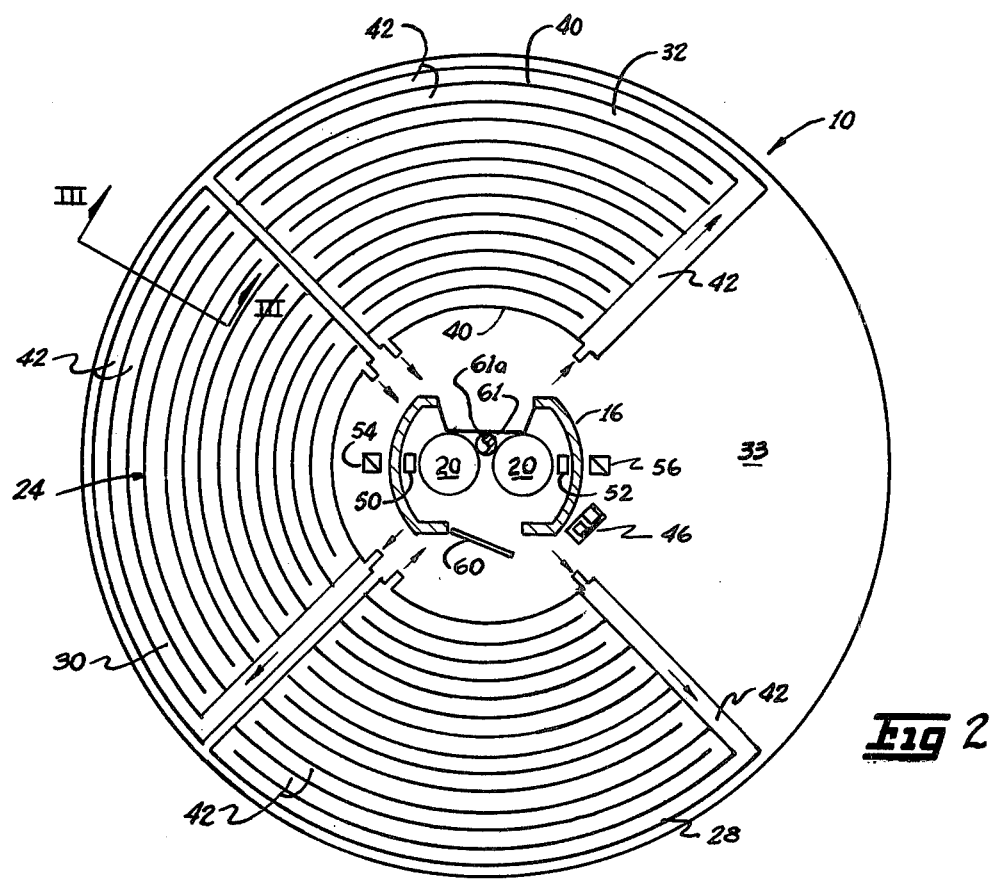
FIG. 2 is a horizontal sectional view taken generally along line II—II of FIG. 1, and showing the arrangement of the flexible conduit system located on the floor of the attic compartment of the structure.

As best seen in FIG. 2, for a northern hemisphere building location, the flexible, liquid conduit system 24 supported on the attic floor may be composed of three sections, or units, 28, 30, 32 which cover the southern, western and eastern exposure sections of the attic floor of the building. The northern section 33 of the attic may be covered by conventional roofing materials, such as shingles, and may be used as a storage space for auxilliary equipment. The roof section over the flexible conduit system 24 is composed of transparent, light-transmitting sheets or panels 34 of glass or plastic to permit passage of sunlight into the attic compartment during daylight hours. It can be understood that the foregoing roof construction and flexible conduit system arrangement would be accordingly reversed in a southern hemisphere building location, with the conduit system 24 and transparent roof sections positioned in western, northern, and eastern exposure sections of the attic to receive direct sunlight during daylight hours.

Figure 3:
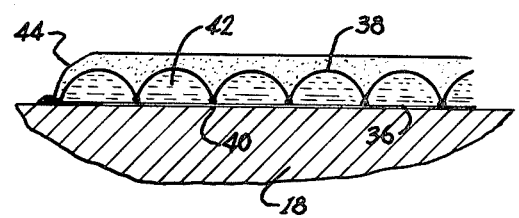
FIG. 3 is an enlarged sectional elevation view of a portion of the flexible conduit system in the attic compartment taken generally along line III—III of FIG. 2.

As best seen in FIG. 3, each section of the flexible conduit system 24 comprises a pair of large sheets 36, 38 of dark, opaque heat absorbing plastic, such as polyvinyl chloride or polyethelyne, which are of sufficient strength and thickness to contain and support liquid therebetween. The two sheets 36, 38 are superimposed and are appropriately heat sealed, or otherwise bonded, along their peripheral edges, as well as along various seal lines 40 intermediate their edges to form a sinuous, continuous flexible passageway or conduit 42 (FIG. 2) for circulation of water outwardly from the central support column 16 to the periphery of the attic floor, and thence back and forth across the attic floor to the central column where it passes back into the top of storage tanks 20. Superimposed above the two dark sheets 36, 38 which form water conduit 42 is a transparent or clear plastic sheet 44 which is also sealed about its peripheral edges to the peripheral edges of the dark sheets to form a flexible air compartment immediately above water conduit 42, thus providing a high temperature air concentration immediately above the conduit and facilitating transfer of solar heat into the circulating water medium. A small pressure regulated air compressor 46 may be located in the attic compartment and communicates by suitable air lines 48 (FIG. 4) with each flexible section 28, 30, 32 to maintain the air compartments above water conduits 42 inflated to a desired low pressure.

As best seen in FIG. 1, the interior of hollow support column 16 communicates by means of air supply conduits, or ducts, illustrated by conduits 50, 52 embedded in the concrete floor of the building structure, with living areas 19 of the building. Although not illustrated, a plurality of supply conduits may be provided, as desired, to provide air flow into the individual rooms of the living area. Similarly, a plurality of air return conduits, illustrated by conduits 54, 56 in FIG. 1, are provided in the ceiling of the living area to communicate the living area with the upper interior portion of hollow support column 16. Fan means 58 provided in the return conduits continuously or intermittently circulates air from the living area through the support column and back to the living area, with air flow in the column being directed over the outer surfaces of the water storage tanks 20 to affect heat transfer from the heated water in the tanks to the air, thereby providing a source of heated air to warm the living area of the building.

As seen in FIG. 2, central support column 16 is provided with an access door 60 in a convenient location to permit access to the compartment for repair and servicing of the various equipment in the column, when desired. The building structure is also provided with a fireplace 61 located in a side wall of column 16 with metal firebox of the fireplace being in direct contact with the metal tanks 20 at some points to effect a direct heat transfer between the firebox and tanks to heat the liquid. A chimney exhaust pipe 61a also extends upwardly through column 16 in contact with the metal tanks to provide additional heat transfer. Suitable insulated doors (not shown) are provided to close off the fireplace when not in use to keep heat from the central column escaping into the living compartment.

The operation of the solar heating system of the present invention may best be described by reference to FIGS. 1 and 4. Storage tanks 20 are provided with a supply of heat-transfer liquid, such as water, from a conventional source, not shown. During hours of sunlight, water is continuously circulated from storage tanks 20 by individual pump units 62–64 and supply conduits 21 into each of the flexible conduit sections 28, 30, and 32 (FIG. 4) on the floor of the attic compartment. Water in each flexible conduit 42 of each section passes at a selected flow rate through the section and back to the central support column 16 where it discharges into the upper portion of the storage tanks by means of return conduits 26. If desired, the upper surface of the floor of the attic compartment on which the flexible conduit sections rest may be sloped slightly inwardly from the outer periphery of the attic to the central support column 16 to facilitate flow of water through the conduit sections as well as drainage of the sections into the tanks 20, when desired.

Depending on the position of the sun during daylight hours and the water temperature in the individual solar heat-collecting sections 28, 30, 32, it may be desirable at certain times of the day to utilize less than all of the sections for collection of solar heat energy. Similarly, when there is no available sunlight for heating the water in the sections to a desired temperature for storage in the tanks, water is not circulated through the sections, but the heated water collected in the tanks 20 may still be employed to heat the air in the living areas of the building. To accomplish these ends, and as best illustrated in FIG. 4, the individual pumps 62–64 for supplying water from the storage tanks under pressure to each of the flexible sections 28, 30, 32 in the attic are controlled by suitable means, such as conventional thermostatic sensing elements 66–68, positioned in the outflow end of conduit 42 of each section. When the temperature of the water in any section falls below a selected temperature, the pump supplying water to that section is stopped and water is circulated only through the remaining sections of the flexible conduit system. In like manner, when the temperature of the water in any cut off section rises to a selected temperature, the pump supplying water to that section is started and water again is circulated through the section to be heated by sunlight energy.

Figure 4:
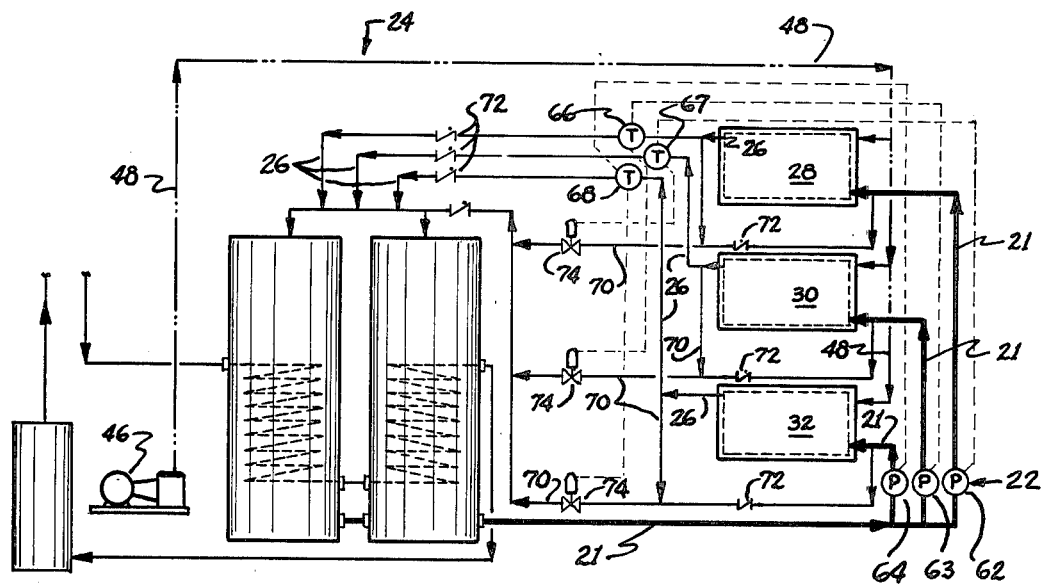
FIG. 4 is a schematic drawing illustrating the water circulation system for the solar heated structure of FIG. 1.

During periods of cold weather when sufficient sunlight is not available for solar heating for an extending period of time, e.g., during nighttime hours, or when it may be desired to repair or replace a flexible conduit section, water in the attic section may be drained back into the storage tanks by suitable drainage conduits, illustrated schematically in FIG. 4 at 70, and suitable check valves 72 and regulatable valves 74 may be provided in the liquid flow lines for this purpose.

The building structure of the present invention may be provided with conventional heating means to provide adequate heat to the living compartment during periods when there is not sufficient hot water in storage tanks 20 to operate the solar heating system, as described. If desired, the heat energy in the water in storage tanks 20 may also be utilized to provide hot water for domestic use, as well as to provide energy for operation of other equipment, e.g., air conditioning, clothes dryer, and the like. In such cases, suitable heat exchange means, e.g., water coils, auxillary air conduits, may be provided in the central column 16 and utilized in a manner believed well known to those skilled in the art.

What is claimed is:

1. A solar heated building structure comprising an exterior shell including side walls and a roof section, a major portion of said roof section comprising light-transmitting panels of material which permit passage of sunlight into the shell, horizontal floor means dividing the shell into a living compartment and an attic compartment above the living compartment and below the roof section, a hollow support column for said floor means extending upwardly through said living compartment to said attic compartment, liquid storage means located in said column, flexible conduit means positioned on the upper surface of said horizontal floor means in said attic compartment beneath said light-transmitting roof panels for receiving sunlight passing therethrough, liquid conduit means communicating said flexible conduit means with said liquid storage means in said column to permit circulation of liquir from said liquid storage means through said flexible conduit means and back to said storage means for heating the liquid in said storage means, air conduit means communicating the interior of said hollow column with said living compartment to permit circulation of air through said column to and from said living compartment, and fan means in said air conduit means for directing air over said liquid storage means in said column and to and from said living compartment to heat said living compartment.

2. A solar heated building structure as defined in claim 1 wherein said flexible conduit means includes at least one solar heat-collecting section comprising a pair of sheets of flexible plastic material having heat absorbing surfaces, one of said sheets being superimposed over the other and bonded to the other along seal lines to form an elongate flexible tubular conduit on said attic floor for passage of liquid therethrough, inlet and outlet ends of said flexible, tubular conduit connected to said liquid conduit means, and pump means in said liquid conduit means for directing liquid in said liquid storage means into and through said flexible tubular conduit and back to said liquid storage means.

3. A solar heated building structure as defined in claim 2 wherein said section includes a light-transmitting sheet of flexible plastic material superimposed over said pair of heat-absorbing sheet of material of said flexible conduit means to form an air compartment above said elongate tubular conduit in said attic compartment.

4. A solar heated building structure as defined in claim 3 including pressure regulated air compressor means connected to said air compartment to maintain said compartment under a predetermined air pressure.

5. A solar heated building structure as defined in claim 2 wherein said flexible conduit means comprises a plurality of said solar heat-collecting sections disposed on said attic floor in juxtaposed relation, pump means in said liquid conduit means for directing liquid from said liquid storage means through the flexible tubular conduit of each of said solar heat-collecting sections, and temperature-sensing means for sensing temperature of liquid in each of said sections and operatively connected to said pump means for starting and stopping the supply of liquid to each section in response to a predetermined temperature of the liquid in that section.

6. A solar heated building structure as defined in claim 5 wherein said liquid conduit means includes an individual liquid supply conduit connected to the inlet end of each of said tubular conduits for supplying liquid thereto from said liquid storage means, said pump means includes an individual pump in each of said individual supply conduits for independently supplying liquid to each of said flexible tubular conduits from said storage means, and said temperature sensing means includes temperature sensitive element positioned in the outlet end of each flexible tubular conduit operatively connected to a respective one of said pumps for cutting on and off said pump in response to a predetermined temperature of liquid passing from said flexible tubular conduit.

7. A solar heated building structure as defined in claim 1 including a fireplace in an outer wall of said hollow support column, and flue means extending upwardly through said hollow support column and roof section for discharging products of combustion from said fireplace, said flue means communicating with the interior of said hollow support column in heat exchange relation with the air passing therethrough to provide additional heating of the air in said column when said fireplace is in use.

8. A solar heated building structure as defined in claim 1 including liquid flow control means in said liquid conduit means for circulating liquid from said liquid storage means through said flexible conduit means and back to said storage means to heat the liquid in said storage means, said liquid flow control means including means for stopping circulation of liquid through said flexible conduit means in response to a predetermined temperature of the liquid, and for starting circulation of liquid through said flexible conduit means in response to a predetermined temperature of the liquid.

9. A solar heated building structure as defined in claim 8 wherein said flexible conduit means comprises a plurality of solar heat-collecting sections supported on said attic floor, each of said sections comprising a long, flexible tubular conduit for passage of liquid therethrough; and wherein said liquid flow control means includes means for selectively starting and stopping circulation of liquid through each individual section in response to temperature of liquid in said section.

* * * * *